United States Patent [19]
Hosoe et al.

[11] Patent Number: 5,759,681
[45] Date of Patent: Jun. 2, 1998

[54] MAGNETIC RECORDING MEDIUM AND MAGNETIC RECORDING SYSTEM USING THE SAME

[75] Inventors: Yuzuru Hosoe, Hino; Kazuetsu Yoshida, Kodaira; Nobuyuki Inaba, Hasuda; Tomoo Yamamoto, Hachioji; Akira Ishikawa, Kodaira; Masaaki Futamoto; Hiroyuki Kataoka, both of Kanagawa-ken; Yoshihiro Shiroishi, Hachioji, all of Japan

[73] Assignee: Hitachi, Ltd., Tokyo, Japan

[21] Appl. No.: 595,303

[22] Filed: Feb. 1, 1996

[30] Foreign Application Priority Data

Feb. 3, 1995 [JP] Japan ................................ 7-017012
Feb. 9, 1995 [JP] Japan ................................ 7-021470

[51] Int. Cl.⁶ ........................................................ G11B 5/66
[52] U.S. Cl. ............... 428/332; 428/336; 428/694 T; 428/694 TS; 428/694 TM; 428/694 R; 428/900; 360/113; 360/119; 360/126; 360/135
[58] Field of Search ................. 428/694 T, 694 TS, 428/694 TM, 694 R, 900, 336, 332; 360/113, 119, 126, 135

[56] References Cited

U.S. PATENT DOCUMENTS

| | | | |
|---|---|---|---|
| 4,687,712 | 8/1987 | Sugita | 428/611 |
| 4,722,869 | 2/1988 | Honda | 428/611 |
| 4,749,628 | 6/1988 | Ahlert | 428/660 |
| 4,920,013 | 4/1990 | Kobayashi | 428/694 |
| 5,227,212 | 7/1993 | Ahlert et al. | 360/97.01 |
| 5,370,928 | 12/1994 | Funabashi et al. | 428/336 |
| 5,549,978 | 8/1996 | Iwasaki | 428/692 |

FOREIGN PATENT DOCUMENTS

| | | |
|---|---|---|
| 0 216 062 A1 | 4/1987 | European Pat. Off. |
| 6176340 | 6/1994 | Japan |
| 6176341 | 6/1994 | Japan |
| 6176342 | 6/1994 | Japan |
| 63-09645 | 11/1994 | Japan |

*Primary Examiner*—Leszek Kiliman
*Attorney, Agent, or Firm*—Antonelli, Terry, Stout & Kraus, LLP

[57] ABSTRACT

A magnetic recording system includes an intermediate layer arranged between adjacent ones of a plurality of magnetic layers constituting a magnetic recording medium, the magnetic recording medium driven by a drive section in the recording direction, and a magnetic head including a write section and a read-back section set in relative motion with respect to the magnetic recording medium. Signals are applied to the magnetic head and the output signals from the magnetic head are read back by a read/write signal processing device. The read-back section of the magnetic head includes a magnetoresistive magnetic head. The magnetic layers of the magnetic recording medium include crystal grains having different crystal orientations and existing in overlapped positions in the direction perpendicular to the medium surface. High-density information read/write operation thus is made possible with an improved reliability.

25 Claims, 11 Drawing Sheets

XIIB—XIIB

XIXB—XIXB

MAGNETIC RECORDING MEDIUM AND MAGNETIC RECORDING SYSTEM USING THE SAME

BACKGROUND OF THE INVENTION

The present invention relates to a magnetic recording system used as an auxiliary recording system for computers and a magnetic recording medium used with the magnetic recording system, more in particular to a magnetic recording system having a recording density higher than 1 Gb/sq.in and a thin-film recording medium suitable for realizing a high recording density.

With the progress of an information society, the amount of information routinely handled is ever on the increase. This has intensified the demand for high recording density and large storage capacity of magnetic recording systems. As a magnetic recording disk unit is increased in recording density, the area of the recording medium per bit recorded decreases, and therefore the read output is reduced thereby making read-back operation difficult. In order to resolve this problem, although the conventional apparatuses perform the write and read operations with a single inductive head, investigations have made to use separate magnetic heads for write and read operations and to use a read-back magnetic head utilizing the magnetoresistive effect.

The magnetoresistive read-back head is suitably used for achieving a high recording density due to its high efficiency. In the magnetoresistive head, an output is obtained by taking advantage of the resistance change caused by the relative change in the direction of magnetization of a magnetoresistive layer with respect to the direction of current due to the leakage magnetic field from the magnetic recording medium. A soft magnetic bias layer may be formed through a non-magnetic spacer layer on the magnetoresistive layer in order to improve the linearity of the response to the magnetic field. The magnetoresistive change is induced basically by a single-layer soft magnetic layer (magnetoresistive layer) with a normal resistance change rate of approximately several percents.

In connection with this, Physical Review Letters, Vol. 61, 1988, pp. 2472–2475 and Physical Review, B, Vol. 43, 1991, pp. 1297–1300, report a magnetoresistive change as large as several tens of percent in maximum in a magnetic film composed of a plurality of magnetic layers accumulated through non-magnetic layers. In this type of magnetic thin film, in which the direction of magnetization of each magnetic layer accumulated is not necessarily coincident with each other, a large resistance change is caused by the change in the relative direction of magnetization under the influence of an external magnetic field. This large magnetoresistive effect caused by this type of multi-layered magnetic thin film is called the giant magnetoresistive effect or the spin-valve effect.

Research is underway for developing a magnetoresistive read-back head having an even higher efficiency using the giant magnetoresistive effect or the spin-valve effect.

A coated medium composed of a substrate coated with magnetic oxide powder was initially used as a magnetic recording medium for a magnetic recording disk unit. In recent years, however, a thin-film medium has been developed with a thin film of a magnetic metal vapor-deposited by sputtering on a substrate. The thin-film medium is high in the density of a magnetic material contained in a magnetic recording layer in comparison with the coated medium, and therefore is suitable for high-density read/write operation. JP-A-63-146219 and IEEE Transactions on Magnetics, Vol. 26, No. 5, 1990, pp. 2700–2705, proposes a multilayered magnetic recording medium including a magnetic recording layer of a thin-film medium composed of a plurality of magnetic layers and at least one non-magnetic intermediate layer inserted between adjacent magnetic layers, whereby the magnetic coupling between the magnetic layers is reduced thereby to reduce the noises caused by the recording medium.

As described above, a read-back head of magnetoresistive type is under development which is high in efficiency and suitably applied for increasing the magnetic recording density. This magnetoresistive magnetic head is high in read-back efficiency and low in thermal noises due to a low head resistance. As a result, the noise (media noise) attributable to the magnetic recording medium which has thus far been hidden behind the large noise generated from the inductive head has come to assume a considerable proportion of the total noises generated in the apparatus. For realizing a high recording density using a magnetoresistive magnetic head, therefore, the media noise is required to be reduced. In a means for reducing the media noise, a multilayered magnetic recording medium including a plurality of magnetic layers with at least a non-magnetic intermediate layer inserted between adjacent ones of the magnetic layers has proposed. Therefore, an increased density of a magnetic recording disk unit is expected by assembling a magnetoresistive read-back head with a multilayered magnetic recording medium.

In practice, however, test production of such a combined magnetic recording disk unit shows that the read output with high recording density is so low since a sufficiently low error rate cannot be obtained for an apparatus as compared with the case using a conventional magnetic recording medium (single-layered magnetic recording medium) having a single magnetic layer. As explained above, in spite of the fact that a high-efficiency read-back head and a low-noise magnetic recording medium have actually been developed as a unit, however, it has not sufficiently studied how these component parts should be combined in order to realize a magnetic recording disk unit having a high recording density.

A Cr film is now widely studied as an intermediate layer of a magnetic recording medium of a multilayered structure (multilayered magnetic recording medium) as disclosed in JP-A-63-146219. The Cr film exhibits superior characteristics when used as an underlayer of a Co-based alloy thin-film magnetic recording medium. In the case where a multilayered magnetic recording medium is fabricated with use Cr material as an intermediate layer, the media noise is reduced as compared with a single-layer medium having a layer thickness equal to the sum of the thicknesses of the magnetic layers. The reduction effect, however, is to the extent of −2 to −3 dB. This much of noise reduction is insufficient for achieving a high recording density of more than 1 Gb/sq.in for a magnetic recording system.

SUMMARY OF THE INVENTION

The object of the invention is to provide a reliable magnetic recording system which solves the above-mentioned problems and is capable of performing high-density information read/write operation.

According to the invention, there is provided a magnetic recording system, comprising a magnetic recording medium including at least one intermediate layer arranged between adjacent ones of a plurality of magnetic layers, a drive section for driving the magnetic recording medium in the recording direction, a magnetic head including a write section and a read-back section, means for moving the magnetic head relatively with respect to the magnetic recording medium, and read/write signal processing means for applying signals to the magnetic head and reading the output signal from the magnetic head, wherein the read-back section of the magnetic head is composed of a magnetoresistive magnetic head, and the magnetic recording medium includes a plurality of magnetic layers having crystal grains of different crystal orientations existing in overlapped positions in the direction perpendicular to the medium surface, so that the media noise thus can be sufficiently reduced, thereby achieving the above-mentioned object.

According to another aspect of the invention, there is provided a magnetic recording system in which the gap between two shield layers holding the magnetoresistive sensor of a magnetoresistive magnetic head therebetween is 0.35 μm or less, and assuming that the product Br×t lies between 10 G·μm (gauss microns) and 100 G·μm inclusive, where t is the total thickness of the magnetic layers of the magnetic recording medium and Br is the residual magnetic flux density measured by applying a magnetic field in the running direction of the magnetic head relative to the magnetic recording medium during write operation (hereinafter referred to as the recording direction). The phase jitter of the output thus can be reduced. Further, the coercivity force of the magnetic recording medium measured by applying a magnetic field in the recording direction is set to 2.4 kOe (kilo-oersted) or more, whereby a sufficient signal strength is obtained for a high recording density, and a reliable magnetic recording system is realized with a recording density of at least 1 Gb/sq.in.

Further, a magnetoresistive magnetic head includes a plurality of conductive magnetic layers with a resistance being changed considerably by relative change of the respective directions of magnetization under the influence of the external magnetic field and a magnetoresistive sensor having at least one conductive non-magnetic layer arranged between adjacent ones of the conductive magnetic layers, wherein the giant magnetoresistive effect or the spin-valve effect is utilized for further enhancing the signal strength. A reliable magnetic recording system having a recording density of more than 3 Gb/sq.in can thus be realized.

A plurality of magnetic layers of a magnetic recording medium may contain Co-alloy crystal grains with the c-axis orientation of the hexagonal closed packed lattice substantially parallel to the medium surface and Co-alloy crystal grains existing in overlapped positions in the direction perpendicular to the medium surface and having the respective c-axis orientations substantially orthogonal to each other. That the respective c-axis orientations of the Co-alloy crystal grains are substantially orthogonal to each other means that the two c-axis orientations of the Co-alloy crystal grains are within the range of ±10° or preferably ±5° from the orthogonal direction.

In the case where a plurality of magnetic layers of a magnetic recording medium are composed of a first magnetic layer near to the substrate surface and a second magnetic layer formed on the first magnetic layer through an intermediate layer, the ratio Nc/Na between Nc and Na lies preferably in 0.2 or more, desirably lies in 0.4 or more as the number of the crystal grains is Nc where the c-axis orientation of the crystal grains of the second magnetic layer lies at substantially right angle of the c-axis orientation of the crystal grains of the first magnetic layer located at a overlapped position in a direction perpendicular to the medium surface, and the number of the crystal grains is Na where the c-axis orientation thereof lies in substantially parallel with the c-axis orientation of the crystal grains of the first magnetic layer. The c-axes of Co-alloy crystal grains being substantially parallel to each other means that two c-axis orientations of Co-alloy crystal grains are within the range of ±10° or preferably ±5° from the parallel direction.

The average crystal orientation perpendicular to the medium surface of the magnetic crystal grains making up one of a plurality of magnetic layers of a magnetic recording, medium may be different from the average crystal orientation perpendicular to the medium surface of the magnetic crystal grains constituting other magnetic layers.

A plurality of magnetic layers may be formed on an underlayer, and the composition of the intermediate layer may be different from that of the underlayer. Also, the intermediate layer may include a plurality of layers of different compositions.

Further, in a multilayered magnetic recording medium including a plurality of magnetic layers and at least one non-magnetic intermediate layer arranged between adjacent ones of the magnetic layers, the non-magnetic intermediate layers may be composed of a combination of a Ta layer and a Cr layer, a combination of a layer with Ta as the main component and a layer with Cr as the main component, or a combination of a Hf layer and a Cr layer, or a combination of a layer with Hf as the main component and Cr as the main component.

Furthermore, carbon is formed in the thickness of 10 nm to 30 nm as a protective layer for the magnetic layers, and a lubricant layer of adsorptive perfluoroalkyl-polyether or the like is formed in the thickness of 2 nm to 20 nm. A reliable magnetic recording medium in high-density recording can thus be obtained. Also, the sliding resistance and corrosion resistance can desirably be improved by the use of a carbide such as tungsten carbide or (W—Mo)—C, a nitride such as (Zr—Nb)—N or silicon nitride, an oxide such as silicon dioxide or zirconia, or boron, boron carbide, molybdenum disulfide or Rh. After forming a protective layer, minute unevennesses are formed in the surface by plasma etching using a miniscule mask, out-of-phase protrusions are generated in the surface of the protective layer using a target of a chemical compound or a mixture, or unevennesses are formed in the surface by heat treatment. In this way, the contact area between the head and the recording medium can desirably be reduced thereby to avoid the problem of the head sticking to the surface of the recording medium at the time of CSS operation.

It is due to the small squareness ratio of the hysteresis loop (hereinafter referred simply as the squareness ratio) of a multilayered magnetic recording medium as compared with the magnetic recording medium composed of a single-layer magnetic layer that the output is reduced in the high recording density region in the case where such a multilayered magnetic recording medium is used. Generally, with a magnetic film used for a magnetic recording medium, the squareness ratio decreases with the decrease in film thickness. In a multilayered magnetic recording medium, the thickness of each magnetic layer is required to be reduced as compared with the single-layer magnetic recording medium, resulting in a smaller squareness ratio. For realizing a reliable magnetic recording system in high recording density using a multilayered magnetic recording medium, it is necessary either to improve the squareness ratio of the multilayered magnetic recording medium or to further reduce noises.

The inventors fabricated multilayered magnetic recording media having different compositions, different thicknesses and different conditions for forming the magnetic layers and the intermediate layers, and evaluated the read/write characteristics by combining each of the multilayered magnetic recording media with a dual-type magnetic head including an inductive head as a write section and a magnetoresistive head for a read-back section. As a result, the inventors found that the read/write characteristics are strongly correlated with the relative crystal orientations between the magnetic crystal grains existing in overlapped positions in the direction perpendicular to the medium surface (along the layer thickness) in a plurality of magnetic layers of a multilayered magnetic recording medium. The result of study is described in detail below.

FIG. 1 is a sectional model view of a microscopic structure of a representative multilayered magnetic recording medium used for the study. This recording medium is fabricated by forming an underlayer 2, a first magnetic layer 3, an intermediate layer 4, a second magnetic layer 5 and a protective layer 6 by sputtering on a substrate 1. The substrate is made of an Al—Mg alloy with the surface thereof plated with Ni—P, a Cr—Ti alloy as the underlayer and the intermediate layer, and a Co—Cr—Pt alloy as the magnetic layers. Also, carbon is used for the protective layer, on which a lubricant layer is formed (the lubricant layer is not shown in FIG. 1). Detailed observation of a sectional structure and a planar structure under the transmission electron microscope shows that as schematically shown in FIG. 1, the underlayer is composed of columnar microcrystals, and columnar crystals making up the first magnetic layer have grown on the underlayer. One to three columnar crystals constituting the first magnetic layers were found to have grown on a single underlayer crystal. The crystal grains making up the intermediate layer and the second magnetic layer have grown one each on each of the columnar crystals making up the first magnetic layer.

Evaluation was made of the read/write characteristics of a multilayered magnetic recording medium for different compositions, thicknesses and the conditions for forming the intermediate layer 4 with the composition and thickness of the underlayer 2 and the first and second magnetic layers 3, 5 kept constant. It was found that noises can be reduced by setting the Ti concentration and thickness of the Cr—Ti alloy intermediate layer 4 within an appropriate range. The difference in the microcrystal structure between a low-noise medium and a medium with a comparatively high noise thus obtained was studied in detail. As a consequence, it was found that the relative crystal orientations of the magnetic crystal grains (such as the crystal grains 7 of the first magnetic layer and the crystal grains 8 of the second magnetic layer shown in FIG. 1) existing in positions overlapped in the direction perpendicular to the medium surface (along the film thickness) are strongly correlated with media noises.

In order to study the relative crystal orientations of the magnetic crystal grains existing in positions overlapped along the film thickness (vertical direction in FIG. 1), a specimen with the substrate 1 and the underlayer 2 removed by mechanical grinding and ion thinning was irradiated with an electron beam from the direction perpendicular to the medium surface and the resulting electron beam diffraction pattern was observed. The electron beam was focused to less than the crystal grain diameter of the magnetic layer.

With media having a high noise, a diffraction pattern as shown in FIG. 2A appeared on most crystal grains. The thickness of the intermediate layer is about one tenth of the thickness of the magnetic layer, and the diffraction pattern is generated substantially by the magnetic layer. This diffraction pattern shows that the crystal grains of the magnetic layer have a hexagonal closed packed lattice (hcp) structure and that the {110} plane of the hexagonal closed packed lattice (hereinafter referred to as hcp-{110}) is parallel to the film surface. The diffraction index of each spot can thus be determined as shown. This diffraction pattern also indicates that the c-axis of the magnetic crystal grains having the hexagonal closed packed lattice and in overlapped positions along the film thickness is oriented in the direction of arrow 21.

With media having small noises, in contrast, the crystal grains having a diffraction pattern as shown in FIG. 2B appeared. This diffraction pattern takes an overlapped form of the diffraction pattern shown in FIG. 2A and the diffraction pattern obtained by rotating the first diffraction pattern of FIG. 2A by 90 degree about the (000) diffraction spot. Consequently, the c-axes of the magnetic crystal grains present in overlapped position along the film thickness is considered oriented in the mutually orthogonal directions as shown by arrows 22 and 23.

The electron beam diffraction pattern of about 50 crystal grains of recording media having different noise levels were studied to determine the number Na of crystal grains having the diffraction pattern shown in FIG. 2A and the number Nc of crystal grains having the diffraction pattern shown in FIG. 2B. The relation between the noise level and the ratio Nc/Na was studied and indicates that noises are reduced with the increase in Nc/Na as shown in FIG. 3. When Nc/Na is set to 0.2 or more, noises can be desirably reduced by at least 1 dB more than when Nc/Na is zero. When the ratio Nc/Na is set to 0.4 or more, on the other hand, noises can be reduced more desirably by 1.3 dB more than when Nc/Na is zero.

The value Nc/Na is strongly dependent on the Ti concentration of the Cr—Ti alloy intermediate layer and the thickness of the intermediate layer. With regard to the Ti concentration of the Cr—Ti alloy intermediate layer, Nc/Na tends to assume a local maximum for a predetermined range of Ti concentration. The range of Ti concentration associated with a local maximum of Nc/Na is dependent on the Pt concentration of the Co—Cr—Pt alloy, and the Nc/Na assumes a local maximum in a higher range of Ti concentration, the higher the Pt concentration. For the Pt concentration of 10 at. %, for example, as shown in FIG. 4, the Ti concentration of 15 to 25 at. % is optimum. In the region where the thickness of the intermediate layer is 0.5 nm or less, the ratio Nc/Na is substantially zero, and if Nc/Na of 0.2 or more is to be obtained, it is necessary to increase the thickness of the intermediate layer to 1.5 nm or more as shown in FIG. 5. For the ratio Nc/Na of 0.4 or more to be obtained, on the other hand, the thickness of the intermediate layer is required to be increased to 2 nm or more. The low-noise medium obtained in this way was combined with a magnetoresistive head to test produce a magnetic recording disk unit. As a result, a highly reliable magnetic disk unit with a low bit error rate could be obtained.

The above-mentioned fact revealed that medium noises can be reduced further in the case where the crystal orientation of magnetic crystal grains existing in overlapped positions perpendicular to the medium surface (along the film thickness) are different. The foregoing example concerns the case in which the hcp-{110} plane of the magnetic crystal grains is parallel to the film surface. Even in the case where the hcp-{100} plane and the hcp-{011} plane are parallel to the film surface, noises can be reduced more when the c-axis orientation is different between the magnetic crystal particles existing in overlapped positions along the film thickness.

In the case where the intermediate layer is composed of Mo, W, V, Ta, Nb, Zr, Ti, B, Si, C, Ni—P or an oxide of any of them different in composition from the underlayer, the average crystal orientation of the second magnetic layer becomes different from that of the first magnetic layer. As a result, the probability becomes high that the crystal orientations of the magnetic crystal grains existing in overlapped positions along film thickness are different, thereby reducing the media noises. A similar effect can be obtained by constructing the intermediate layer in double structure instead of changing the composition of the underlayer and the intermediate layer and by inserting a lower intermediate layer composed of Mo, W, V, Ta, Nb, Zr, Ti, B, Si, C, Ni—P or an oxide of any thereof as a main component between the first magnetic layer and the intermediate layer shown in FIG. 1.

FIG. 6 shows an X-ray diffraction spectrum 41 of a magnetic recording medium including the inter5 mediate layer 4 of a double-layered structure of FIG. 1 having a lower intermediate layer composed of 2 nm-thick carbon and an upper intermediate layer composed of a 2 nm-thick Cr—Ti alloy, and an X-ray diffraction spectrum 42 of a specimen in which the protective layer and the second magnetic layer are removed by plasma etching from the front surface of the recording medium of the same construction. In the X-ray diffraction spectrum 41 associated with the case in which both the first and second magnetic layers exist, a peak 43 indicating that the hcp-{110} plane is parallel to the film surface and a peak 44 indicating that the hcp-{100} plane is parallel to the film surface appear. In the X-ray diffraction spectrum 42 with the second magnetic layer removed, by contrast, a peak 43 indicating that the hcp-{110} plane is parallel to the film surface appears but not substantially any peak indicating that the hcp-{100} is parallel to the film surface. This points to the fact that the first magnetic layer is different from the second magnetic layer in the average crystal orientation. This construction also reduces noises by 1 to 2 dB.

Further, as a result of studying methods for preventing the reduction in coercivity, that is, preventing the reduction in read-back output at high linear recording density and at the same time reducing media noises effectively for multilayered recording media, the inventors have found that media noises can be reduced considerably without reducing the coercivity by constructing the intermediate layer inserted between magnetic layers in double layers of Ta/Cr or Cr/Hf.

In FIG. 7, curves 201, 202, 203 represent the relation between the thickness of the intermediate layer (the sum of thickness between Ta and Cr layers) on the one hand and the read-back output (S), media noise (N) and the signal-to-noise (S/N) ratio in an intermediate layer composed of two layers of Ta and Cr on the other hand.

This medium is so constructed that a Cr underlayer of 50 nm in thickness is formed on an Al—Mg alloy substrate with an Ni—P plated surface, and then a 20 nm-thick CoCrTa alloy magnetic layer, an intermediate layer and a 20 nm-thick CoCrTa alloy magnetic layer were deposited. The intermediate layer is composed of two layers of Ta and Cr with the same thickness. The upper magnetic layer is covered with a protective layer of carbon (C) 50 nm in thickness. The point where the thickness of the intermediate layer is zero corresponds to the 40 nm-thick CoCrTa-alloy single layer. The Cr concentration of the CoCrTa alloy is 16 at. % and that of Ta is 3 at. %.

Measurements were taken under the conditions of the linear recording density of 150 kFCI. Numerals 204, 205, 206 in FIG. 7 designate curves for comparing the results obtained using Cr as a currently wide-spread method for the intermediate layer.

As seen from this diagram, in the case where the intermediate layer is composed of Cr, the media noise is reduced by about 2 to 3 dB by setting the thickness of the intermediate layer to 2 nm or more. Insertion of an Cr intermediate layer, however, undesirably reduces coercivity and also the read-back output. Therefore, substantially no improvement is achieved in terms of S/N ratio.

When an intermediate layer composed of Ta and Cr is used, on the other hand, media noise is reduced remarkably by 4 to 5 dB for the thickness of the intermediate layer of 3 nm or more, and in addition, the read-back output is not deteriorated, thereby making it possible to improve the S/N ratio remarkably by as much as 6 dB.

A similar effect was obtained also in the case where a Co-based alloy magnetic film was used with CoNi, CoFe, CoPt, CoIr, CoW, CoRe, CoNiZr, CoCrPt or CoNiCr instead of CoCrTa as the main component of the magnetic film.

Also, a similar effect of improving the S/N ratio was obtained when an intermediate layer composed of Hf and Cr was employed instead of a Ta/Cr intermediate layer. This was also the case when an alloy was used composed of at least selected one of elements including Zr, Nb, Ti, V, Mo and W added to any one of Ta, Hf and Cr.

As described above, the use of an intermediate layer comprised of a Ta/Cr or a Hf/Cr double structure reduces the media noise remarkably for the probable reason mentioned below.

Normally, as seen from the prior art, in the case where a Cr film is used for an intermediate layer, an epitaxial relationship holds between the (100) plane of Cr having a body-centered cubic structure and the (110) plane of a CoCr alloy having a hexagonal closed packed lattice structure. This property causes a predetermined relationship to occur in the crystal orientation of Co-based alloy layers formed above and below a Cr layer used as an intermediate layer, and the upper Co-based alloy thin film assumes the same crystal orientation as the lower Co-based alloy film.

According to the invention, in contrast, a Ta or a Hf film is formed before a Cr film on a Co-based alloy magnetic film constituting an underlayer of a magnetic layer. This Ta or Hf film is amorphous and plays the role of breaking the epitaxial connection with the Co-based alloy thin film. Further, due to the (100) orientation of the Cr film formed on the Ta (Hf) film, the epitaxial relation described above causes the Co-based alloy film formed thereon to have (110) orientation and the c-axis providing a magnetic easy axis to be directed into the plane. In other words, this intermediate layer structure breaks the crystalline connection of the upper and lower Co-based alloy films while at the same time generating a structure of the upper and lower layers having the magnetic easy axis thereof directed into the plane.

According to the present invention, the media noises are remarkably reduced while maintaining a high read-back output due to the fact that the relationship between the magnetic easy axes of the upper and lower magnetic layers are broken with both the magnetic easy axes directed into the plane.

With regard to the magnetic characteristics of the magnetic layer, assume that the coercivity measured by applying a magnetic field in the direction of the head drive at the time of read/write operation is 2.4 kOe or more and the product Br×t of the residual magnetic flux density Br and the total thickness of the magnetic layers t is in the range of 10 to 100

G·µm. Superior read/write characteristics are obtained desirably in a high-recording density region of at least 2 Gb/sq.in.

FIG. 8 shows the relationship between coercivity and the S/N ratio of the system. In this diagram, the system S/N ratio was studied using media having different values of Br×t for each coercivity, and the maximum values of the system S/N thus obtained for each coercivity was plotted. The measurement conditions employed are identical to those according to the first embodiment described later. When the coercivity is reduced below 2.4 kOe, the system S/N is reduced below unity, with the result that the noise exceeds the signals.

FIG. 9 shows the relationship between the phase jitter of the output signal and the product Br×t in the case where a high-density signal of a predetermined frequency is written or read. In this measurement, as shown in FIG. 10, the read-back output from the magnetic head was converted into pulses by a low-pass filter 31, a differentiation circuit 32 and a pulse conversion circuit 33, and variations in the pulse interval δ was analyzed by a jitter meter 34. In FIG. 8, the proportion of the standard deviation σ of δ with respect to the average value of δ is indicated as a jitter. When the product Br×t assumes a value outside of the range of 10 to 100 G·µm, the jitter reaches more than 15%, thereby making bit distinction difficult. Also, as shown in FIG. 11, in the case where the distance between two shield layers (shield gap) formed with a magnetoresistive sensor therebetween is larger than 0.35 µm, the jitter increases to more than 15%.

Therefore, the shield gap is preferably 0.35 µm or less. The thickness of the intermediate layer is preferably 1.5 nm or more as described above. An excessive thickness of the intermediate layer, however, increases the interval between the magnetic head and the bottom magnetic layer and undesirably deteriorates the overwrite characteristics. Especially, in the case where the intermediate layer is of a double structure, the increased thickness of the intermediate layer deteriorates the overwrite characteristic. In order to solve this problem, it is effective to use a soft magnetic thin film of an Fe—Co—Ni alloy, a Fe—Si alloy or the like having a saturated magnetic flux density larger than the conventional Ni—Fe alloy as the magnetic pole of the recording head. In particular, a satisfactory result was obtained with a soft magnetic thin film having a saturated magnetic flux density of 1500 gauss or more.

DESCRIPTION OF THE PREFERRED EMBODIMENTS

The present invention is described in detail below with reference to embodiments.

[Embodiment 1]

Figure 12A:
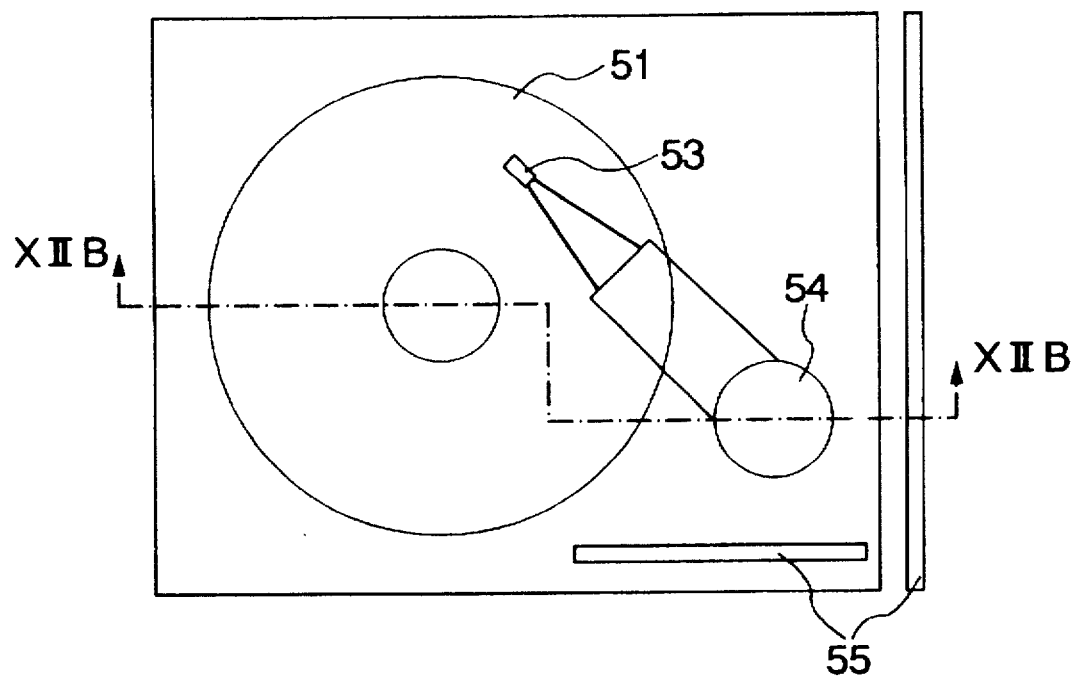
FIG. 12A is a model plan view of a magnetic recording system.
Figure 12B:
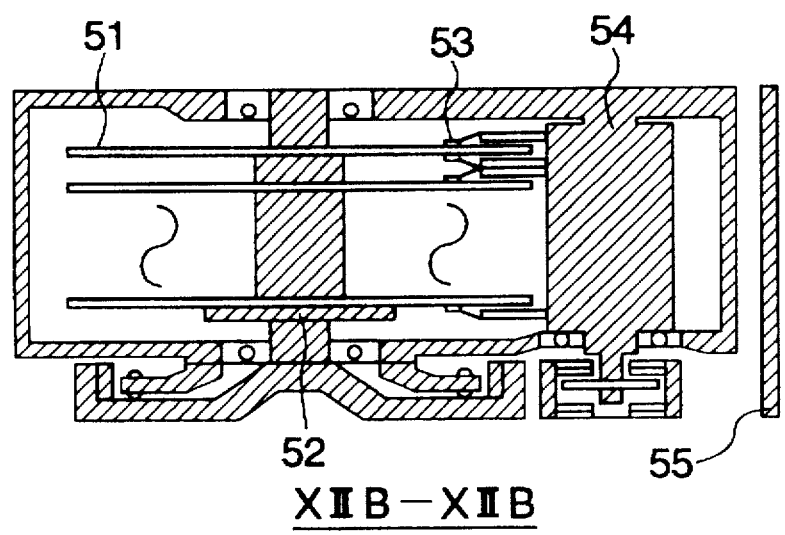
FIG. 12B is a model sectional view taken in line XIIB—XIIB in FIG. 12A.
Figure 15:
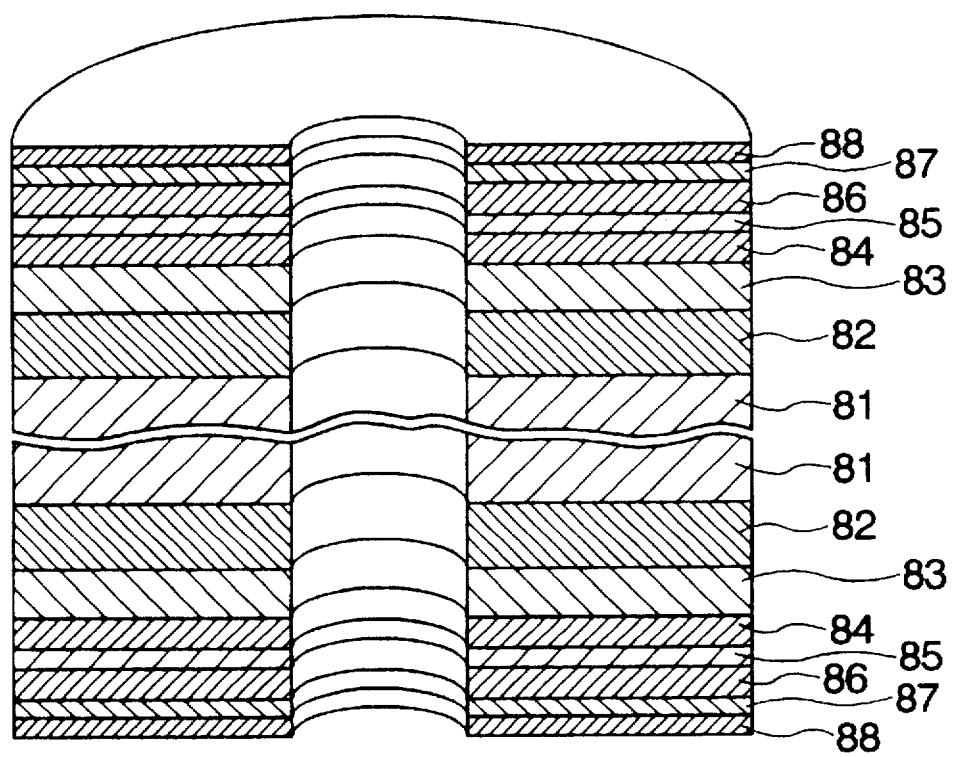
FIG. 15 is a model sectional view showing an example structure of a multilayered magnetic recording medium.

A multilayered magnetic recording medium having a sectional structure schematically shown in FIG. 15 was fabricated and incorporated into a magnetic recording system. The magnetic recording system, a model plan view of which is shown in FIG. 12A, has a well-known configuration comprising a magnetic recording medium 51, a drive section 52 for rotatively driving the magnetic recording medium 51, a magnetic head 53 with drive means 54 therefor and a read/write signal processing means 55 for the magnetic head, as shown in the model sectional view of FIG. 12B.

Figure 13:
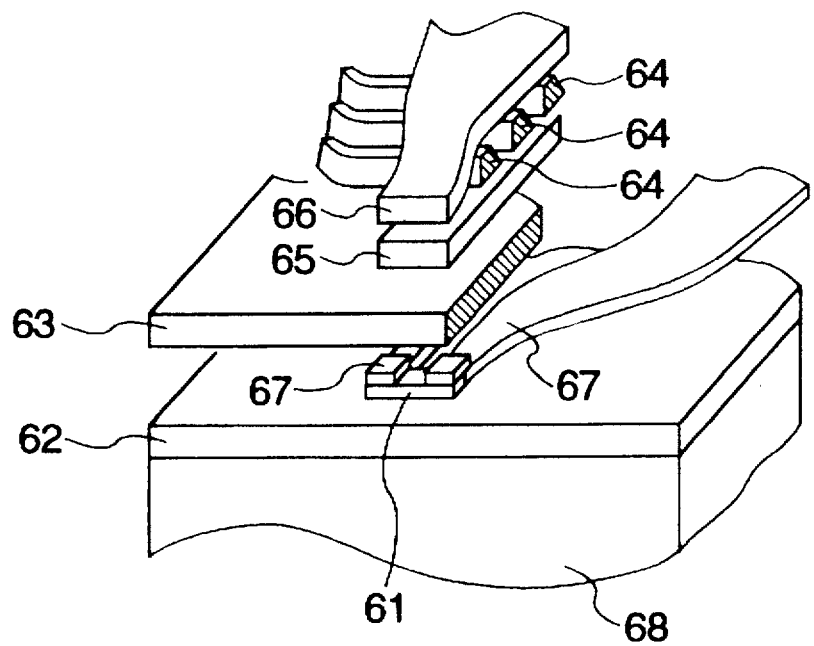
FIG. 13 is a sectional view for explaining an example magnetic head.

The structure of the magnetic head 53 is shown as a model in FIG. 13. This magnetic head is a separated read/write head including a combination of an inductive magnetic head for write operation and a magnetoresistive head for read-back operation formed on a substrate 68. The portion of the magnetoresistive sensor 61 held between the lower shield layer 62 and the upper shield layer 63 functions as a read-back head, while the lower recording magnetic pole 65 and the upper recording magnetic pole 66 sandwiching the coil 64 acts as a write head. The output signal from the magnetoresistive sensor 61 is produced externally through an electrode pattern 67.

Figure 14:
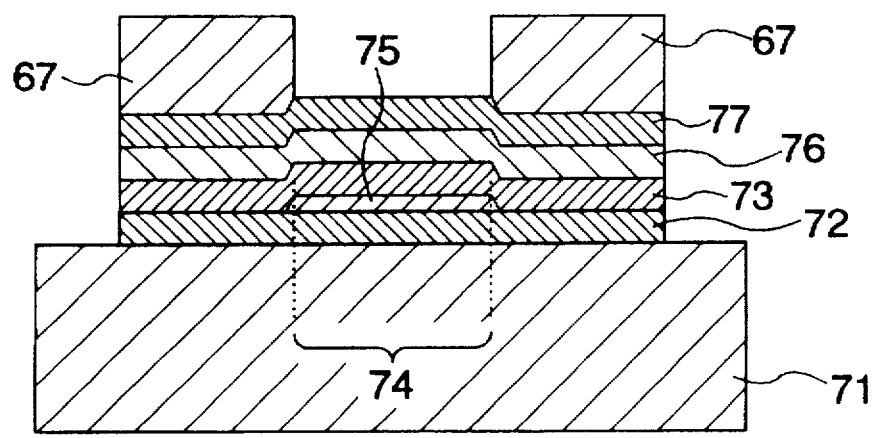
FIG. 14 is a model diagram showing an example sectional structure of a magnetoresistive sensor of a magnetic head.

The sectional structure of the magnetoresistive sensor is shown in FIG. 14. This magnetoresistive sensor includes a thin-film magnetoresistive conductive layer 73 of ferromagnetic material formed on a gap layer 71 between the shield layer and the magnetoresistive sensor, an antiferromagnetic magnetic domain control layer 72 for defining the thin-film magnetoresistive conductive layer as a single magnetic domain, a non-magnetic layer 75 for breaking the exchange interaction between the antiferromagnetic magnetic domain control layer and the thin-film magnetoresistive conductive layer in a magnetic sensor section 74 of the thin-film magnetoresistive conductive layer, a soft magnetic layer or a permanent magnet film bias layer 77 as a means for generating a bias magnetic field against the magnetic sensor section 74 and a high-resistance layer 76 for regulating the current division ratio between the soft magnetic layer or the permanent magnet film bias layer 77 and the thin-film magnetoresistive conductive layer 73.

A method for fabricating the magnetic head shown in FIG. 13 is described below.

A sintered material with aluminum oxide and titanium carbide as main components is used as a substrate 68 for the slider. An Ni—Fe alloy film formed by sputtering is used for shield layers 62, 63 and recording magnetic poles 65, 66. The thickness of the upper and lower shield layers 62, 63 is 1 μm, the distance between the upper and lower shield layers 62, 63 is 0.27 μm, and the thickness of the recording magnetic poles 65, 66 is 3 μm. A gap layer of aluminum oxide is formed by sputtering in the respective gaps between the shield layers, the magnetoresistive sensor 61 and the recording magnetic poles. The thickness of the gap layer between each shield layer and the magnetoresistive sensor is 125 nm, that of the gap layer between the recording magnetic poles is 300 nm, and that of the gap between each shield layer and each recording magnetic pole (the distance between read head and write head) is about 3 μm. A coil 64 is made of Cu 3 μm thick. An Ni—Fe alloy layer 20 nm in thickness was formed by sputtering as a thin-film magnetoresistive conductive layer 73 (FIG. 14) of the magnetoresistive sensor, an NiO layer 30 nm thick as an antiferromagnetic domain control layer 72, an Nb layer 2 nm thick as a non-magnetic layer 75 for breaking the exchange interaction between the thin-film magnetoresistive conductive layer and the antiferromagnetic domain control layer, an Ni—Fe—Nb alloy soft magnetic layer 30 nm thick as a soft magnetic bias layer 77, and further a Cu thin film 100 nm thick as an electrode pattern 67.

The multilayered magnetic recording medium having a model sectional structure shown in FIG. 15 includes a substrate 81 composed of an Al—Mg alloy, reinforced chemical glass, Ti, Si, Si—C, carbon, crystallized glass, ceramics or the like, a non-magnetic plated layer 82 composed of Ni—P, Ni—W—P or the like formed on the two sides of a substrate which may be made of an Al—Mg alloy, an underlayer 83 composed of an alloy with Cr, Mo and/or W as the main component, a first magnetic layer 84 and a second magnetic layer 86 composed of Co—Ni—Zr, Co—Cr—Al, Co—Cr—Ta, Co—Cr—Pt, Co—N—Cr, Co—Cr—Nb, Co—N—Cr—Pt, Co—Cr—Pt—B, Co—Cr—Pt—Ta, Co—Cr—Pt—Si or the like, a non-magnetic intermediate layer 85 composed of an alloy with Cr, Mo, W, V, Ta, Nb, Zr, Ti, B, Si, C and/or N—P as the main component and formed between the first and second magnetic layers, a protective layer 87 composed of carbon, boron, silicon carbide, silicon nitride, silicon dioxide, tungsten carbide, (W—Mo)—C, (W—Zr)—C or the like, and a lubricant layer 88 composed of perfluoroalkyl-polyether or the like.

A method for fabricating this multilayered magnetic recording medium is described below.

A plated layer 82 of Ni with 12-wt-% P was formed in the thickness of 13 μm on the two sides of the 15 disk substrate 81 having an outer diameter of 95 mm, an inner diameter of 25 mm and a thickness of 0.4 mm and composed of Al with 4-wt-% Mg (the numeral attached before the atomic symbol represents the content of the particular material). The surface of the non-magnetic substrate was smoothly polished on the lapping machine until the average roughness factor Ra of the surface reaches 2 nm, cleaned and dried. After that, a texture in substantially circumferential direction was formed on the disk substrate surface by pressing the abrasive tape of the tape polishing machine (as disclosed, for example, in JP-A-62-262227) on the two disk sides in the presence of abrasive grains through contact rolls while rotating the disk substrate. Further, the dirts including abrasive material attached on the substrate were cleaned off and the substrate was dried.

The disk substrate thus formed was increased in temperature in vacuum up to 270° C. in a magnetron sputtering device, and an underlayer 83 of Cr with 18-at-% Pt having a thickness of 30 nm was formed under the argon pressure of 2 mTorr. A first magnetic layer 84 having a thickness of 12 nm composed of Co with 20-at-% Cr and 10-at-% Pt, an intermediate layer 85 having a thickness of 2.5 nm composed of Cr with 18-at-% Ti, and a second magnetic layer 86 having a thickness of 12 nm were sequentially formed on the underlayer 83. The composition of the second magnetic layer was the same as that of the first magnetic layer. Then, a carbon protective layer 87 having a thickness of 25 nm was formed on the second magnetic layer. The surface of the carbon protective layer 87 was electrostatically coated with polystyrene particles. With this coating as a mask, plasma etching was performed. Minuscule unevennesses were thus formed in the surfaces. As the last step, a lubricant layer 88 of adsorptive perfluoroalkyl-polyether was formed on the protective layer.

Figure 1:
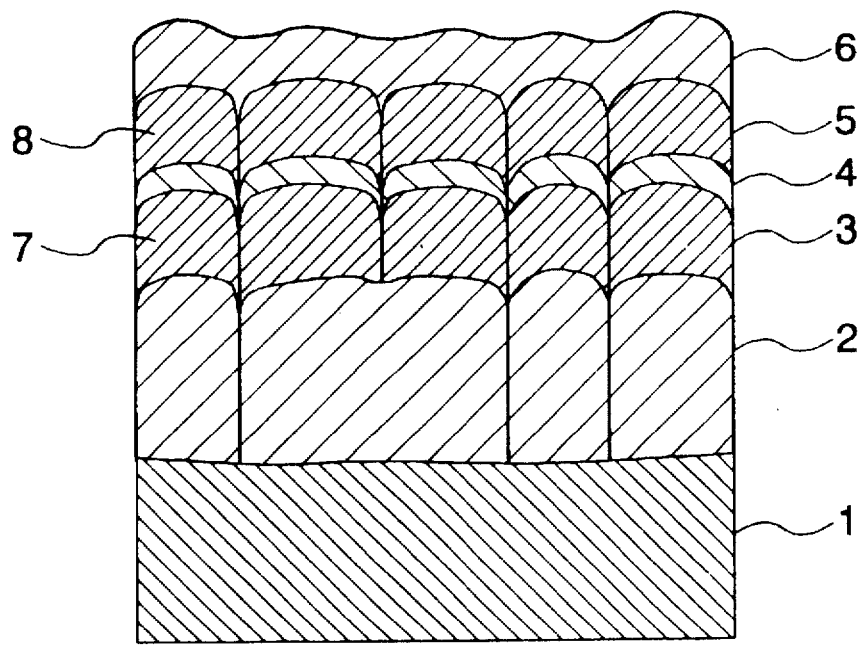
FIG. 1 is a model sectional view showing a microscopic structure of a multilayered magnetic recording medium.
Figures 2A, 2B:
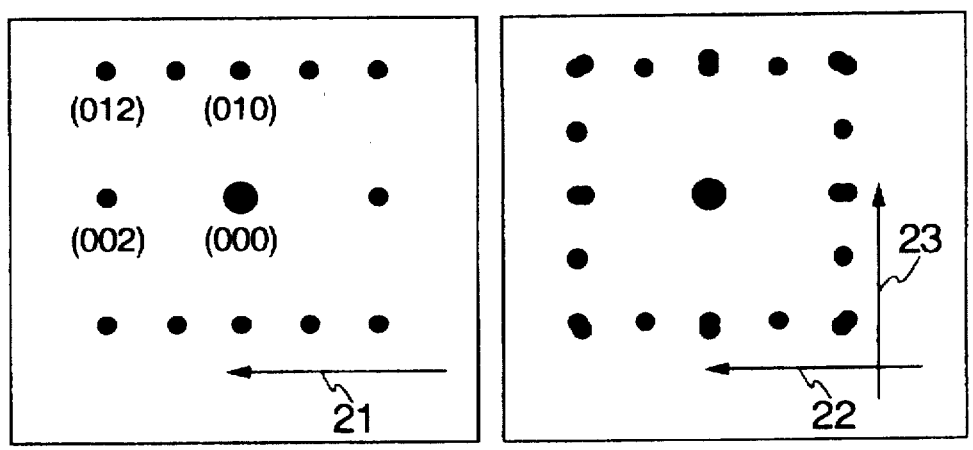
FIGS. 2A and 2B are diagrams showing an electron beam diffraction pattern from two magnetic crystal grains existing at overlapped positions along the film thickness.
Figure 3:
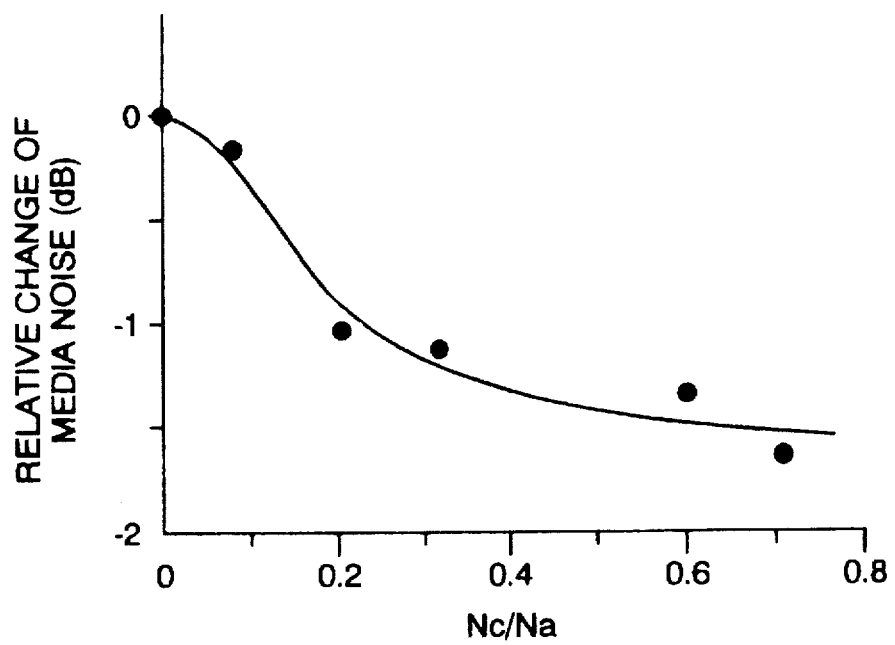
FIG. 3 is a diagram showing the relationship between noises and the ratio Nc/Na, where Nc is the number of crystal grain pairs each including two grains existing in overlapped positions along the film thickness and having the c-axis orientations substantially perpendicular to each other and Na is the number of crystal grain pairs with each two grains having c-axis orientations substantially parallel to each other.
Figure 4:
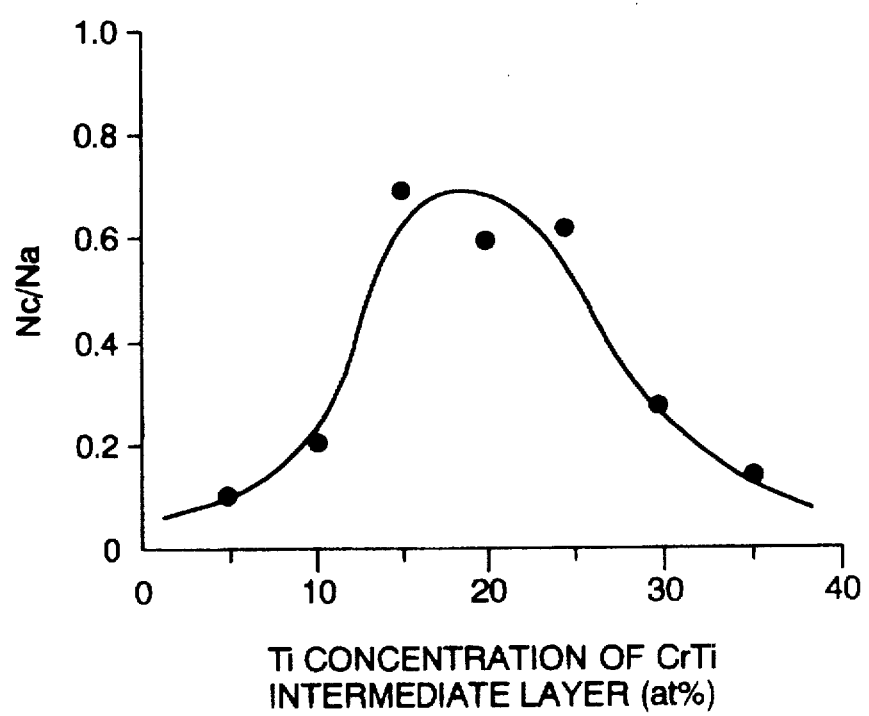
FIG. 4 is a diagram showing the relationship between the Ti concentration of a CrTi intermediate layer and Nc/Na.
Figure 5:
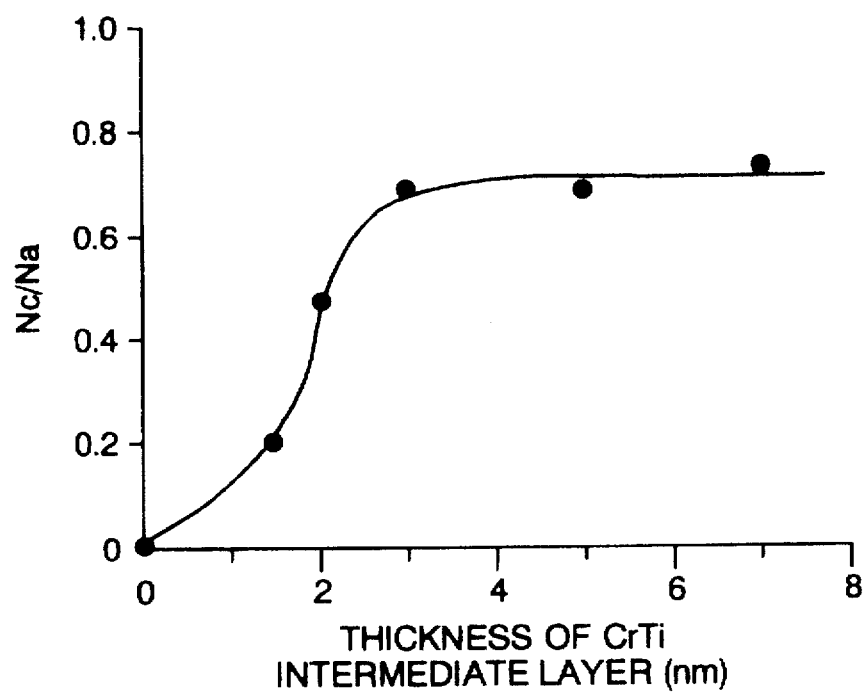
FIG. 5 is a diagram showing the relationship between the thickness of a CrTi intermediate layer and Nc/Na.
Figure 6:
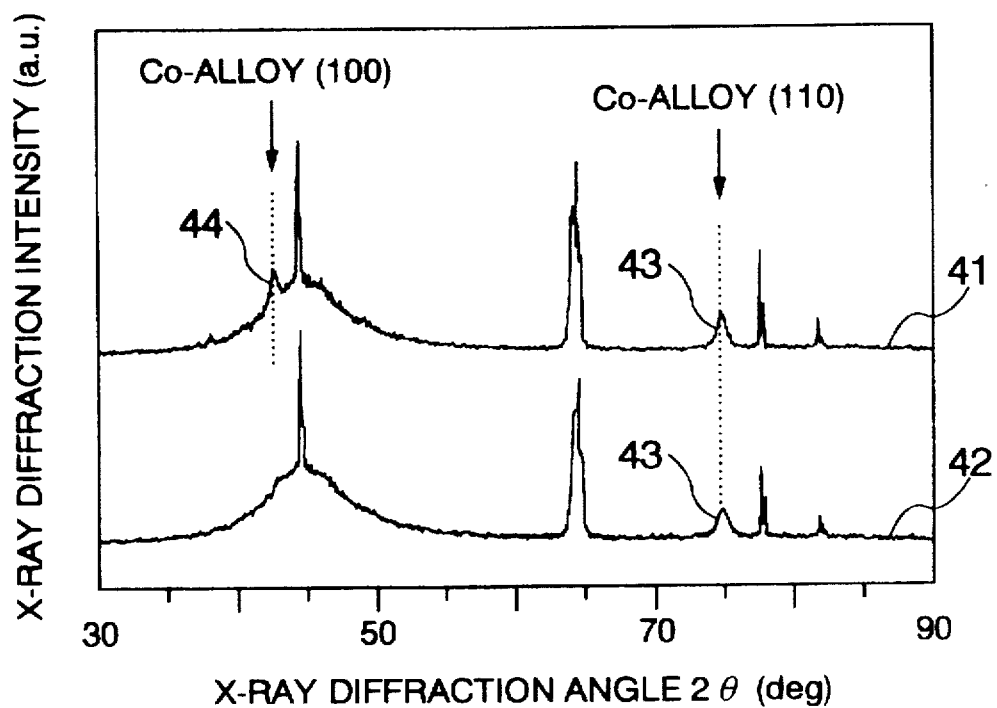
FIG. 6 is a diagram showing an X-ray diffraction spectrum for a multilayered magnetic recording medium according to an embodiment of the invention.

The magnetic recording medium thus formed was analyzed by X-ray diffraction. It was found that crystals were grown in the Cr—Ti underlayer in such an orientation that the {100} plane of the body-centered cubic (bcc) structure is substantially parallel to the substrate and that crystals were grown in the magnetic layer in such an orientation that the {110} plane of the hexagonal closed packed lattice (hcp) of the magnetic layer is substantially parallel to the substrate. The specimen from which the substrate and the underlayer are removed by mechanical grinding and ion thinning was irradiated with an electron beam from the direction perpendicular to the recording medium surface, and the electron beam diffraction pattern was observed. The electron beam was focused on about 50 crystal grains and the diffraction pattern was checked. The number Na of the crystal grains producing the diffraction pattern as shown in FIG. 2A and the number Nc of the crystal grains producing the diffraction pattern as shown in FIG. 2B were determined. The ratio Nc/Na was found to be 0.45. Also, measurements taken by applying a magnetic field along the circumference of the disk included the coercivity of 2.96 kOe and the product Br×t of the residual magnetic flux density Br and total magnetic layer thickness t of 85 G·μm.

The read/write characteristics were evaluated under the conditions of the head flying height of 30 nm, the linear recording density of 210 kBPI and the track density of 9.6 kTPI using a magnetic recording system according to the present embodiment. The system S/N of 1.6 was obtained. Also, the input signal to the magnetic head was subjected to 8-9 code modulation and the output signal was subjected to the maximum likelihood signal processing. Information of 1 Gb/sq.in could be read/written. In addition, the bit error rate after 50 thousand iterations of head seek test conducted from the inner to the outer periphery was 10 bits/surface or less. and the MTBF of 150 thousand hours could be achieved.

[Embodiment 2]

Figure 11:
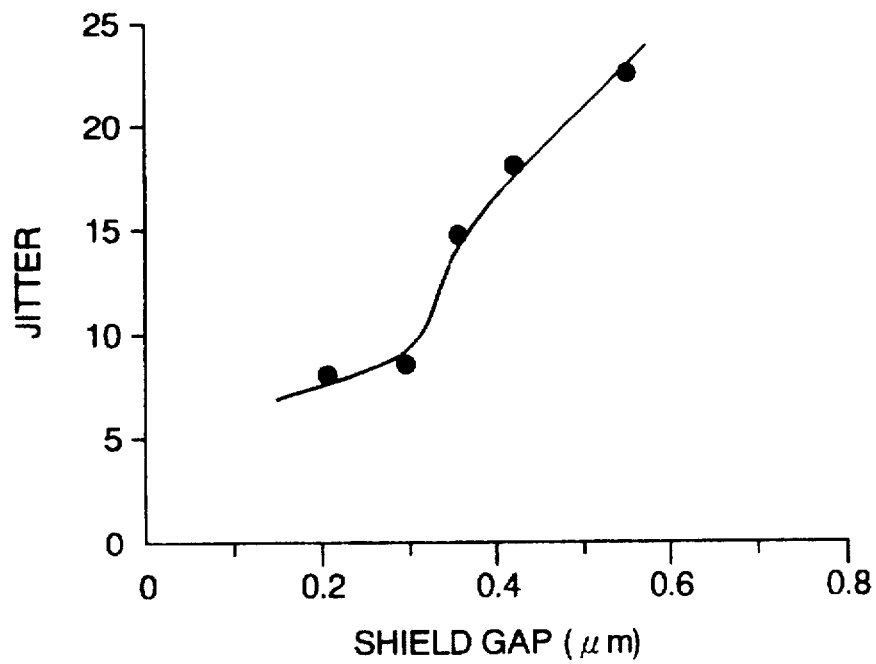
FIG. 11 is a diagram showing the relationship between phase jitter and shield gap.

A multilayered magnetic recording medium was fabricated on a glass substrate without forming any non-magnetic plated layer as in the first embodiment, and was incorporated into the magnetic recording system shown in FIG. 11. A head of separated read/write type was used as the magnetic head of the magnetic recording system.

A glass substrate having a diameter of 2.5 inches and a thickness of 0.4 mm was used as a substrate of the recording medium, and a 15-nm-thick Cr layer was formed by sputtering on the surface of the glass substrate under the argon pressure of 2 mTorr. Further, as in the first embodiment, an underlayer, a first magnetic layer, an intermediate layer, a second magnetic layer, a carbon protective layer and a lubricant layer were formed in that order on the Cr layer.

The magnetic recording medium thus formed was analyzed by X-ray diffraction. As a result, it was found that crystals were grown in the underlayer in such an orientation that the {100} plane or the {110} plane of the body-centered cubic (bcc) structure was substantially parallel to the substrate and that crystals were grown in the magnetic layers in such an orientation that the {110} plane or the {011} plane of the hexagonal closed packed lattice (hcp) structure was substantially parallel to the substrate. A specimen from which the substrate and the underlayer were removed by mechanical grinding and ion thinning was irradiated with an electron beam from the direction perpendicular to the recording medium surface, and the resulting electron beam diffraction pattern was observed. The electron beam was focused on about 30 magnetic crystal grains with the hcp-{110} plane thereof positioned substantially parallel to the substrate, and the diffraction pattern was checked. The number Na of crystal grains producing the diffraction pattern as shown in FIG. 2A and the number Nc producing the diffraction pattern as shown in FIG. 2B were determined. The ratio Nc/Na of 0.5 was obtained. Also, the coercivity measured by applying a magnetic field in the direction along the disk circumference was 2.5 kOe and the product of the residual magnetic flux density Br and the total magnetic layer thickness t was 80 G·μm.

As a result of an evaluation made of the read/write characteristics under the conditions of the head flying height of 26 nm, the linear recording density of 210 kBPI and the track density of 9.6 kTPI using the magnetic recording system according to the. present embodiment, the system S/N of 1.6 was obtained. Also, the input signal to the magnetic head was subjected to the 8-9 code modulation and the output signal was subjected to the maximum likelihood signal processing, whereby information of 2 Gb/sq.in could be read/written. In addition, the bit error rate after 50 thousand iterations of the head seek test was 10 bits/surface or less, and the MTBF of 150 thousand hours could be achieved.

[Embodiment 3]

A multilayered magnetic recording medium having a layered structure similar to the magnetic recording medium according to the first embodiment and having a non-magnetic intermediate layer of double-layered structure was fabricated, and incorporated into a magnetic recording system having a configuration similar to that of the first embodiment.

In fabricating a magnetic recording medium, an underlayer having a thickness of 40 nm composed of Cr with 18-at-% Ti and a first magnetic layer having a thickness of 13 nm composed of Co with 21-at-% Cr and 12-at-% Pt were formed by sputtering under the argon pressure of 2 mTorr on a disk substrate prepared in a manner similar to the first embodiment. A double-layered intermediate layer including a carbon layer of 2.5 nm in thickness and a Cr with 23-at-% Ti layer of 2 nm in thickness was deposited on the resulting assembly. Further, a second magnetic layer having a thickness of 13 nm composed of Co with 21-at-% Cr and 12-at-% Pt was deposited. Then, a carbon protective layer and a lubricant layer were deposited in that order on the second magnetic layer as in the first embodiment.

The magnetic recording medium formed in this way was analyzed by X-ray diffraction. Crystals were found to have grown in the underlayer in such an orientation that the {100} plane of the body-centered cubic (bcc) structure was substantially parallel to the substrate, and the crystals in the magnetic layer were found to have grown in such an orientation that the {110} plane or the {011} plane of the hexagonal closed packed lattice (hcp) was substantially parallel to the substrate. After removing the second magnetic layer by ion milling, crystal orientation was analyzed by X-ray diffraction. As a consequence, it was found that the diffraction peak indicating that the {011} plane of the hexagonal closed packed lattice (hcp) structure is substantially parallel to the substrate disappeared and the average crystal orientation was different between the first magnetic layer and the second magnetic layer. Also, the coercivity as measured by applying a magnetic field along the circumference of the disk was 2.82 kOe, and the product Br×t of the residual magnetic flux density and the total magnetic layer thickness was 90 G·μm.

The read/write characteristics were evaluated under the conditions of the head flying height of 30 nm, the linear recording density of 210 kBPI and the track density of 9.6 kTPI using a magnetic recording system according to the present embodiment. The system S/N of 1.6 could be obtained. Also, the input signal to the magnetic head was subjected to the 8-9 code modulation, and the output signal to the maximum likelihood signal processing. Information of 2 Gb/sq.in could be read/written. In addition, after 50 thousand iterations of the head seek test conducted from inner to outer periphery, the bit error rate was 10 bits/surface or less, and the MTBF of 150 thousand hours could be achieved.

[Embodiment 4]

Figure 16:
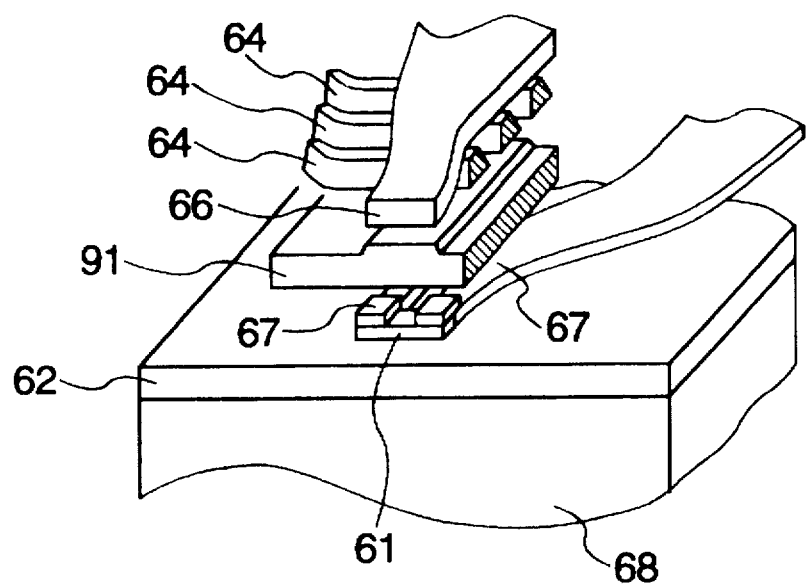
FIG. 16 is a sectional view for explaining another example of magnetic head.

A separate read/write magnetic head having a construction as shown in FIG. 16 was attached to the magnetic recording system according to the third embodiment and used as a magnetic head according to the present invention.

This magnetic head basically has the same structure as the separate read/write magnetic head according to the first embodiment shown in FIG. 13. The magnetic head according to the present embodiment, however, is different in that according to the present embodiment, the upper shield layer 63 and the lower recording magnetic pole 65 in FIG. 13 are replaced by a single layer 91 having dual functions of shielding and write magnetic pole. This shield-write layer 91, as its name implies, is such that the functions of the upper shield layer and the lower recording magnetic pole are performed by a single soft magnetic layer, and uses an N—Fe alloy film formed by sputtering according to the embodiment under consideration.

The use of a magnetic head having this structure could minimize the increase in bit error rate, especially when the track density was set to 8 kTPI or more. This is considered by reason of the fact that the distance between write head and read head was reduced and the positioning error of the write and read heads due to the effect of the yaw angle with a rotary actuator was decreased. Also, the overwrite characteristic could be improved by about 6 dB as compared with the third embodiment by using a Fe—Co—Ni alloy film formed by plating with a saturated magnetic flux density as large as 16000 gauss as an upper magnetic pole.

[Embodiment 5]

Figure 17:
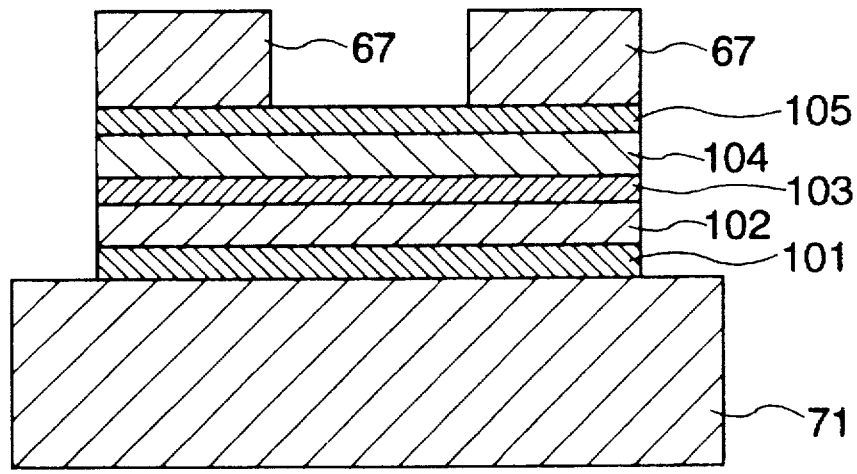
FIG. 17 is a model diagram showing another example sectional structure of the magnetoresistive sensor of a magnetic head.

In a magnetic recording system having a similar configuration to the first embodiment, a magnetic head was constructed as a separate read/write magnetic head having the same structure as the fourth embodiment, and a read-back magnetic head was constructed using a magnetoresistive sensor having the sectional structure shown in FIG. 17.

This magnetoresistive sensor is of such a type as to utilize the resistance change caused by the relative change in the magnetization direction between two magnetic layers separated by a non-magnetic layer (the change in magnetic reactance due to the spin-valve effect). A Ti layer having a thickness of 2 nm constituting a buffer layer 101, an Ni with 20-at-% Fe alloy layer having a thickness of 3 nm constituting a first magnetoresistive layer 102, a Cu layer having a thickness of 1.5 nm constituting a non-magnetic layer 103, an Ni with 20-at-% Fe alloy layer having a thickness of 3 nm constituting a second magnetic layer 104 and an Fe with 50-at-% Mn alloy layer having a thickness of 5 nm constituting an antiferromagnetic layer 105, were formed by sputtering in that order on an aluminium oxide gap layer 71 formed between the shield layer and the magnetoresistive sensor.

In this magnetoresistive sensor, in which magnetization of the second magnetoresistive layer is fixed in a direction by an exchange bias magnetic field from the antiferromagnetic layer, a resistance change occurs due to the change in the magnetization direction of the first magnetic layer under the influence of the leakage magnetic field from the magnetic recording medium. The use of titanium as a buffer layer orients the {111} crystal lattice plane of the first and second magnetoresistive layers in parallel to the film surface, whereby the exchange interaction between the magnetoresistive layers is discouraged, thereby leading to an efficiency twice as high as that of the magnetoresistive sensor according to the first embodiment.

According to the present embodiment, a carbon substrate having a diameter of 1.3 inches, a thickness of 0.4 mm and a surface roughness of 1 nm was used. A Cr underlayer having a thickness of 1 μm was formed on the two sides of the substrate under the same conditions and by use of the same sputtering device as in the first embodiment. Further, the surface of the Cr underlayer was ground with an abrasive tape containing an abrasive of 1 μm or less in grain size inside a vacuum chamber, thereby forming a texture in substantially circumferential direction. A Cr with 20-at-% Ti underlayer having a thickness of 50 nm was further formed, followed by forming a Co with 21-at-% Cr and 15-at-% Pt layer having a thickness of 11 nm as a first magnetic layer, a Cr with 25-at-% Ti having a thickness of 2.5 nm as an intermediate layer and a Co with 21-at-% Cr and 15-at-% Pt layer having a thickness of 11 nm as a second magnetic layer, in that order. After that, a carbon protective film having a thickness of 25 nm was formed. In addition, an etching mask having an average opening distance of between 50 μm and 100 μm inclusive was formed on the surface of the carbon protective film, and the portion of the carbon protective layer not covered by the mask was etched to the depth of 15 nm by the oxygen plasma etching process. As a result, an isle-like protrusion having an average diameter of between 50 μm and 100 μm inclusive and a height of 15 nm was formed on the surface of the carbon protective layer. As the last step, a lubricant layer of adsorptive perfluoroalkyl-polyether was formed on the protective layer.

As a result of X-ray diffraction analysis of the magnetic recording medium thus formed, it was found that crystals in the Cr—Ti underlayer have grown in such an orientation that the {100} plane or the {110} plane of the body-centered cubit (bcc) structure was substantially parallel to the substrate and that crystals in the magnetic layer have grown in such an orientation that the {110} plane or the {011} plane of the hexagonal closed packed lattice (hcp) structure was substantially parallel to the substrate. A specimen from which the substrate and the underlayer were removed by mechanical grinding and ion thinning was irradiated with an electron beam from the direction perpendicular to the recording medium surface and an electron beam diffraction pattern was observed. The electron beam was focused on about 30 magnetic crystal grains with the hcp-{110} plane thereof positioned substantially parallel to the substrate, and the diffraction pattern was checked. The number Na of the crystal grains producing the diffraction pattern as shown in FIG. 2A and the number Nc of the crystal grains producing the diffraction pattern shown in FIG. 2B were determined. As a result, the ratio Nc/Na of 0.67 was obtained. Also, the coercivity as measured by applying a magnetic field in the direction along the circumference of the disk was 2.62 kOe and the product Br×t of the residual magnetic flux density and the total magnetic layer thickness was 66 G·μm.

The read/write characteristics were evaluated under the conditions of the head flying height of 23 nm, the linear recording density of 260 kBPI and the track density of 11.6 kTPI using a magnetic recording system according to the present embodiment. The system S/N ratio of 1.2 was obtained. Also, the input signal to the magnetic head was subjected to the 8-9 code modulation, and the output signal to the maximum likelihood signal processing, with the result that information of 3 Gb/sq.in could be read/written. In addition, the bit error rate after 50 thousand iterations of the head seek test conducted from the inner to outer periphery was 10 bits/surface or less, and the MTBF of 150 thousand hours could be achieved.

[Embodiment 6]

Figure 18:
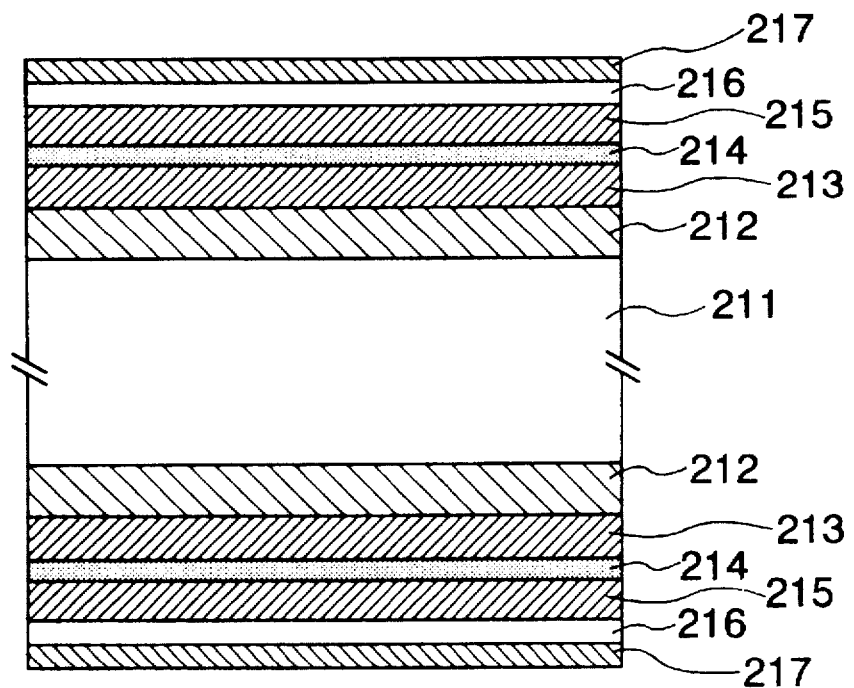
FIG. 18 is a sectional view showing an example multilayered magnetic recording medium according to the present invention.

A multilayered magnetic recording medium according to an embodiment of the invention will be described with reference to FIG. 18. A multilayered magnetic recording medium according to the embodiment is formed on a non-magnetic substrate 211 composed of an Al—Ng alloy plated with Ni—P alloy, a Ti alloy, reinforced glass or an organic resin, ceramics or the like. A Cr underlayer 212, a first magnetic layer 213, an intermediate layer 214, a second magnetic layer 215 and a C protective film 216 are formed in that order by sputtering on the non-magnetic substrate. Further, a lubricant 217 is formed by being coated on the assembly. The thickness of the Cr underlay 212 is 50 nm. The agnetic layer 213 and the second magnetic layer 215 are ade of a Co alloy layer with 16-at-% Cr and 3-at-% Ta having a thickness of 20 nm, and the intermediate layer a double-layer film of Ta and Cr of equal thickness, the sum of thicknesses being changed in the range from 3 nm to 25 nm. The thickness of the C protective film is 50 nm, and the lubricant layer 217 is made of an adsorptive perfluoroalkyl-polyether.

The coercivity as measured by means of the vibrating sample magnetometer (VSM) was from 2000 to 2150 oersted. This value is equivalent to or exceeds the coercivity value of 2100 oersted for the single-layer magnetic recording medium fabricated by replacing the three layers including the first and second magnetic layers and the intermediate layer with a single-layer Co alloy with 16-at-% Cr and 3-at-% Ta having a thickness of 40 nm.

Next, the read/write characteristics were measured. Evaluation was made using a dual-type magnetic including a write inductive thin-film magnetic head and a read magnetoresistive magnetic head having an effective gap length of 350 nm with the relative speed between the medium and the magnetic head set to 12 m/s and the flying spacing to 80 nm. The result is shown by solid lines 201 to 203 in FIG. 7. (Case 1)

As an example case, with the exception that an intermediate layer was fabricated as an single layer of Cr with the thickness of 3 nm to 25 nm, a double-layer film medium was fabricated under the same conditions as in the sixth embodiment, and the read/write characteristics were measured under the same conditions as the sixth embodiment. The result is shown in dashed lines 204 to 206.

Figure 7:
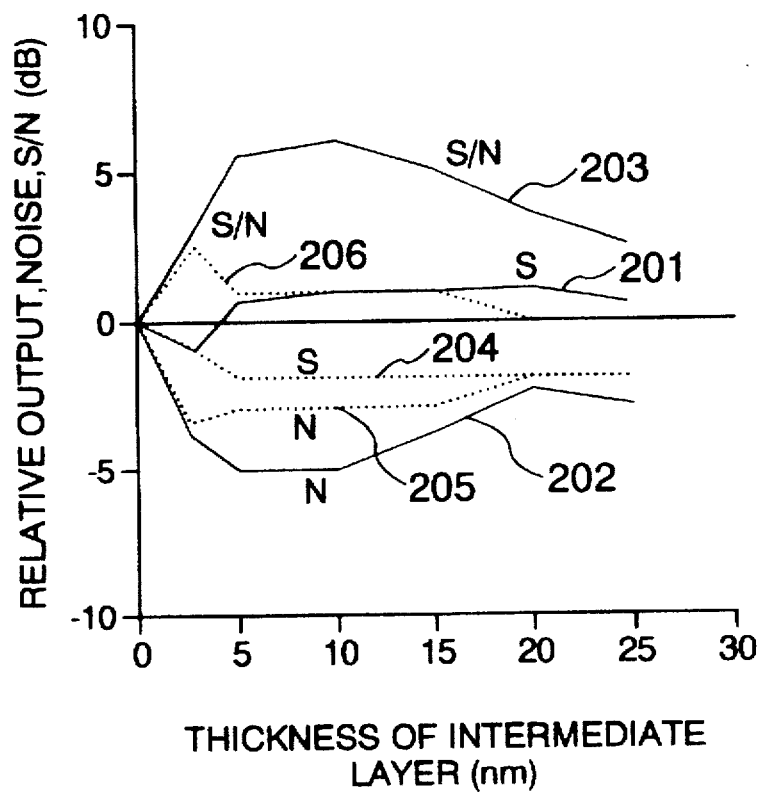
FIG. 7 is a characteristics diagram showing the relationship between the relative output, the relative media noise and the relative S/N ratio for conventional multilayered magnetic recording media and the present invention.
Figure 8:
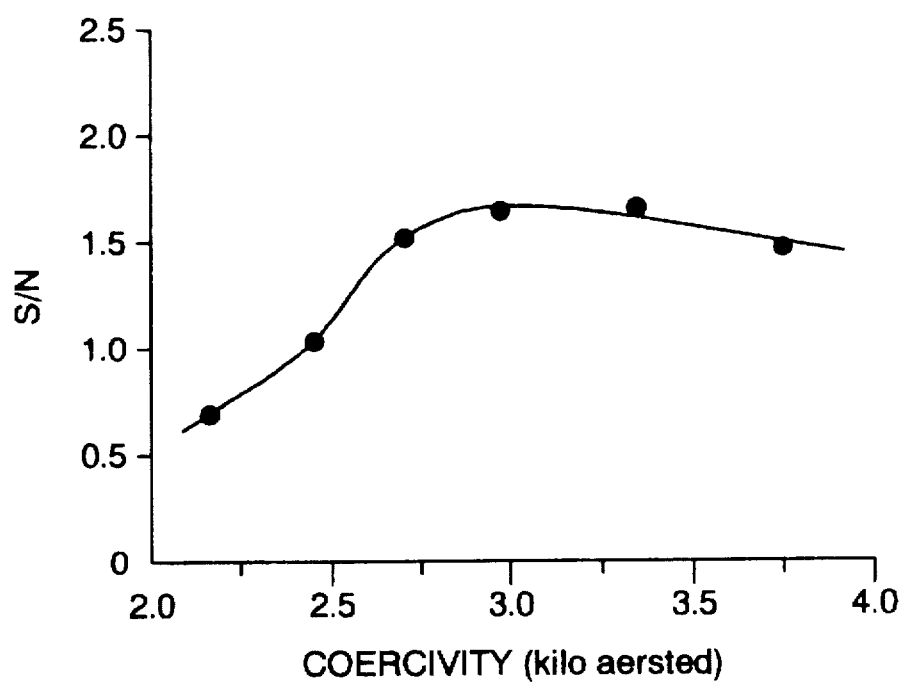
FIG. 8 is a diagram showing the relationship between coercivity and system S/N.
Figure 9:
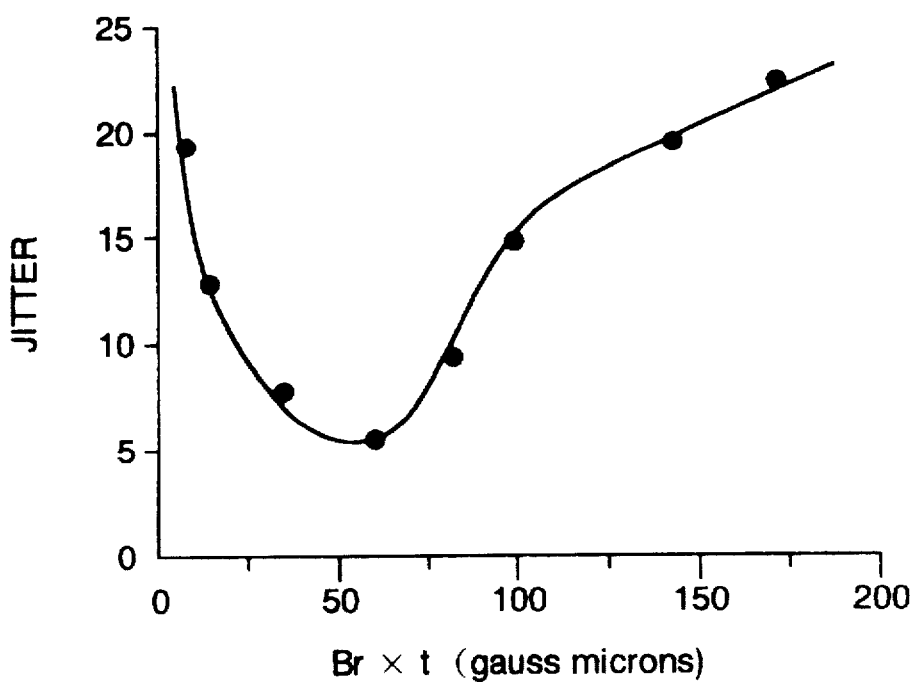
FIG. 9 is a diagram showing the relationship between phase jitter and Br—t.
Figure 10:
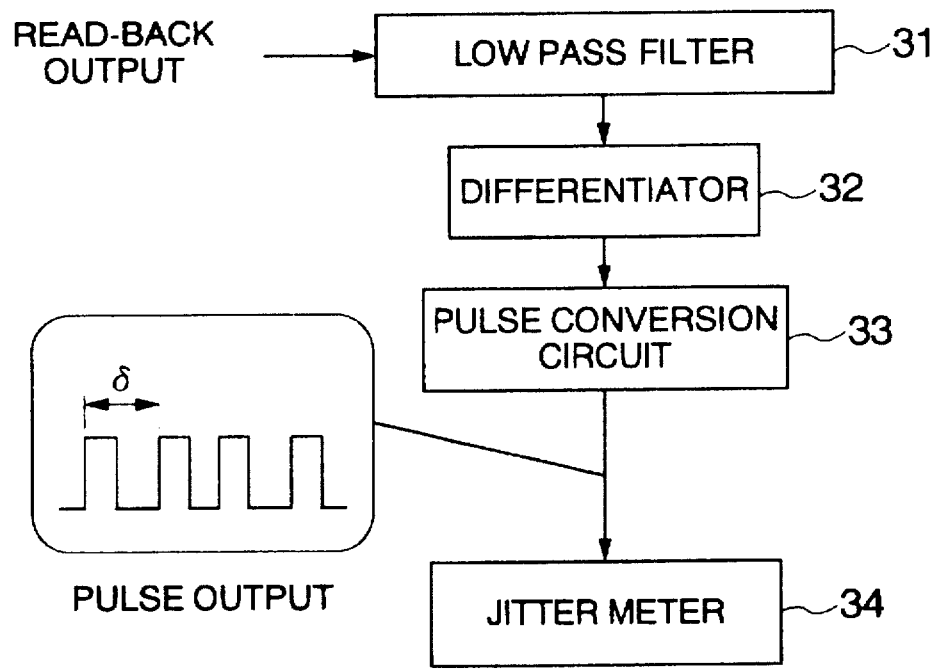
FIG. 10 is a schematic diagram showing a device for measuring the phase jitter.

As understood from FIG. 7, the intermediate layer for both the media is set to the thickness of 3 nm or more to reduce the medium noise. In spite of this, the use of the double-layer intermediate layer according to the invention is seen to be more effective and reduce the medium noise by 2 to 3 dB more than when the medium of the example case is used. Also, the read-back output is higher than that for the single-layer medium, and the signal-to-noise ratio could be improved by about 6 dB more than with the single-layered medium and by about 4 dB more than with the medium of the example case.

A similar effect was obtained also when a combination of Hf and Cr was used instead of the Ta—Cr combination as a material of the intermediate layer.

This was also the case when at least one element was added as selected from a group including Zr, Nb, Ti, V, Mo and W for the layer composed of Ta, Hf and/or Cr. The same can be said when CoPt, CoNi, CoFe, CoCr, CoMo, CoW, CoRe, CoNiZr, CoCrPt or CoNiCr was used instead of CoCrTa as a material of the magnetic layer.

When the magnetic layer is formed of three layers in the manner similar to the sixth embodiment, on the other hand, the media noise is further reduced as compared with the noise for the double-layered magnetic layer. It was confirmed that this effect was improved when a double-layered film of Ta and Cr (or Hf and Cr) was used as an intermediate layer.

[Embodiment 7]

Figure 19A:
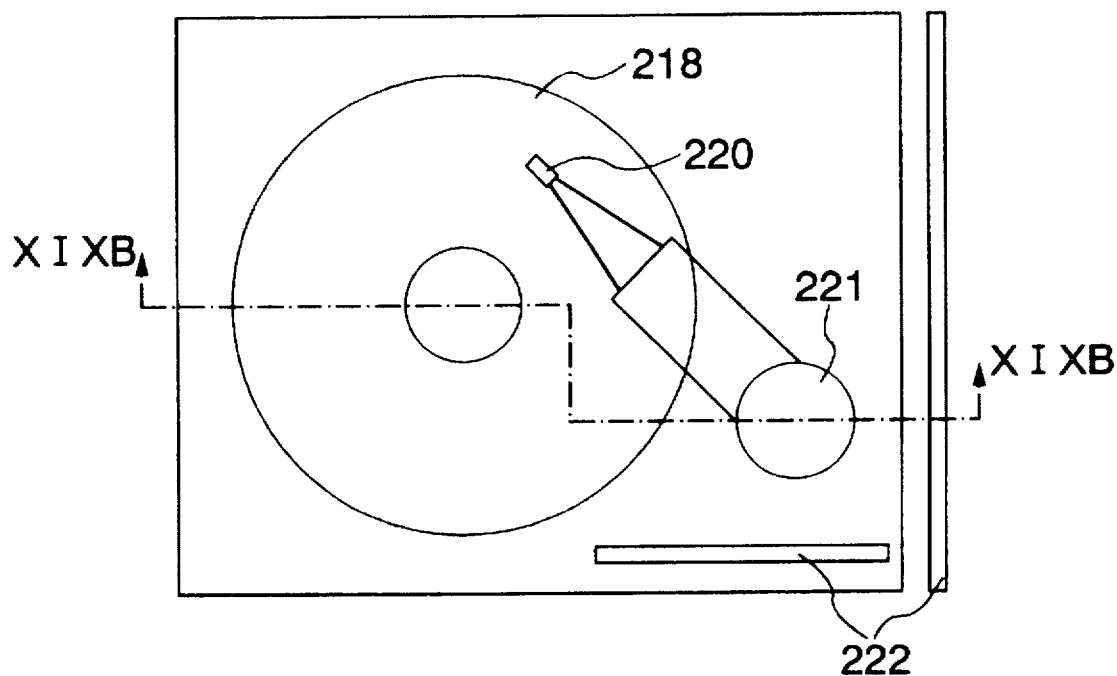
FIG. 19A is a diagram for explaining a magnetic recording system according to an embodiment of the invention.
Figure 19B:
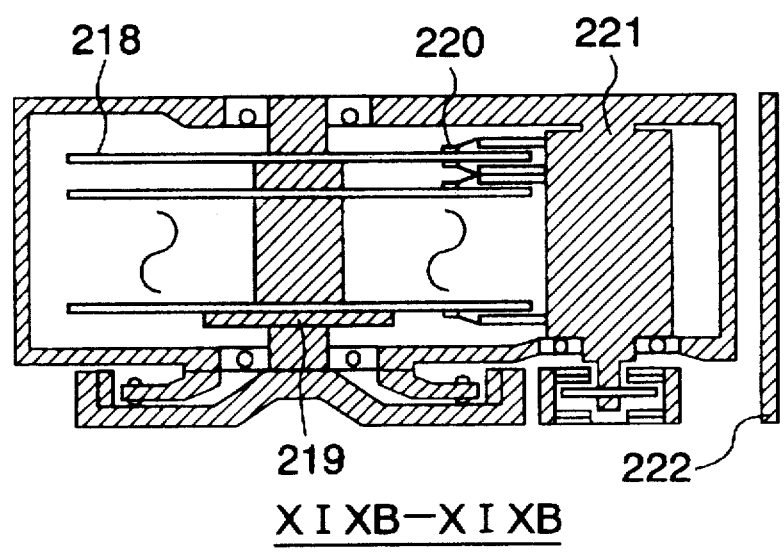
FIG. 19B is a model sectional view taken in line XIXB—XIXB in FIG. 19A.

A magnetic recording system was fabricated by incorporating four boards of the multilayered magnetic recording medium of the sixth embodiment. A plan view and a sectional view of this system are shown in FIGS. 19A and 19B respectively. This magnetic recording system comprises a magnetic recording medium 218, a drive section 219 for rotating the recording medium, a magnetic head 220 with drive means 221, and read/write processing means 222 for the magnetic head, as is well known. In this magnetic recording system, the magnetic recording medium was composed of a multilayered magnetic recording medium as in the sixth embodiment, and a dual-type magnetic head was used as the magnetic head by combining an inductive thin-film write magnetic head and a magnetoresistive read-back magnetic head.

According to the embodiment under consideration, the signal-to-noise ratio (S/N) was improved by 3 dB or more as compared with the conventionally well-known magnetic recording system configured of a multilayered magnetic recording medium in which the intermediate layer of the multilayered magnetic recording medium was replaced by a Cr layer. As a result, the capacity was improved by a factor of 1.5 or more. A system having a storage capacity of 1 Gb/sq.in with a head flying height of 50 nm could be realized by appropriately processing the input/output signals of the magnetic head.

According to the present invention, a high S/N ratio and a low bit error rate are obtained, and therefore an average interval between malfunctions of 150 thousand hours or more can be realized with a high recording density of 1 Gb/sq.in.

We claim:

1. A multilayered magnetic recording medium comprising a plurality of magnetic layers stacked in a direction perpendicular to a surface of the recording medium and at least one intermediate layer arranged between adjacent ones of said magnetic layers;

wherein each of the adjacent magnetic layers having the at least one intermediate layer therebetween, includes crystal grains, projections of the crystal grains of the adjacent magnetic layers, projected in the direction perpendicular to the surface of the recording medium, overlapping with crystal grains of the other of the adjacent magnetic layers at overlapped positions, and wherein the crystal grains of adjacent magnetic layers whose projections overlap crystal grains of the other adjacent magnetic layer, and the overlapped crystal grains, have different crystal orientations.

2. A magnetic recording medium according to claim 1, wherein said magnetic layers include a first magnetic layer near to the substrate surface and a second magnetic layer formed on said first magnetic layer through an intermediate layer, and wherein the ratio Nc/Na is at least 0.2, where Nc is the number of crystal grains of said second magnetic layer with the c-axis orientation thereof substantially orthogonal to the c-axis orientation of the crystal grains of the first magnetic layer whose projections overlap the crystal grains of the second magnetic layer in the overlapped positions, and Na is the number of crystal grains of the second magnetic layer with the c-axis orientation thereof substantially parallel to the c-axis orientation of such crystal grains of said first magnetic layer whose projections overlap the crystal grains of the second magnetic layer in the overlapped positions.

3. A magnetic recording medium according to claim 1, wherein the average crystal orientation in the direction perpendicular to the medium surface of the magnetic crystal grains constituting at least one of the magnetic layers is different from the average crystal orientation in the direction perpendicular to the medium surface of the magnetic crystal grains constituting the other magnetic layers.

4. A magnetic recording medium according to claim 1, wherein the crystal grains of the adjacent magnetic layers, whose projections in the direction perpendicular to the surface of the recording medium overlap crystal grains in the other of the adjacent magnetic layers, include Co-alloy crystal grains, Co-alloy crystal grains of one of the adjacent magnetic layers having a c-axis orientation of the hexagonal closed pack lattice thereof substantially parallel to the surface of the recording medium, and the Co-alloy crystal grains of the other of the adjacent magnetic layers, whose projections respectively overlap with Co-alloy crystal grains of said one of the adjacent magnetic layers which have the c-axis orientation substantially parallel to the recording medium surface, have a c-axis orientation of the hexagonal closed pack lattice thereof substantially orthogonal to the surface of the recording medium.

5. In a multilayered magnetic recording medium comprising a plurality of magnetic layers and at least one intermediate layer arranged between adjacent ones of said magnetic layers,
- a magnetic recording medium, wherein the direction of the magnetic easy axis of said magnetic layers is located within the film plane of said magnetic layers, and the directions of the magnetic easy axes of said respective magnetic layers being not correlated with each other.

6. In a multilayered magnetic recording medium comprising a plurality of magnetic layers and at least one intermediate layer arranged between adjacent ones of said magnetic layers,
- a magnetic recording medium, wherein said intermediate layer is composed of two kinds of layers, and one of said two kinds of layers is made of Ta, Hf or the alloy of Ta or Hf including at least one element selected from Zr, Nb, Ti, V, Mo and W, and the other of said two kinds of layers is made of Cr or the alloy of Cr including at least one element selected from Zr, Nb, Ti, V, Mo and W.

7. A magnetic recording medium according to claim 6, wherein said intermediate layer is such that a Cr layer is formed on selected one of a Ta layer and a Hf layer.

8. A magnetic recording medium according to claim 7, wherein said intermediate layer is such that the sum of thicknesses of the Cr layer and selected one of the Ta layer and the Hf layer is 2 to 20 nm.

9. A magnetic recording medium according to claim 6, wherein said magnetic layers are composed of a Co-based alloy.

10. A magnetic recording system comprising:
- a magnetic recording medium including a plurality of magnetic layers stacked in a direction perpendicular to a surface of the recording medium and at least an intermediate layer each arranged between adjacent magnetic layers;
- a drive section for driving said magnetic recording medium in the recording direction;
- a magnetic head including a write section and a read-back section;
- means for driving said magnetic head into a motion relative to said magnetic recording medium; and
- read/write signal processing means for applying signals to the magnetic head and reproducing the output signal from said magnetic head;
- wherein the read-back section of said magnetic head includes a magnetoresistive magnetic head, and
- wherein each of the adjacent magnetic layers having the intermediate layer therebetween has a plurality of crystal grains, a projection of the crystal grains of each of the adjacent magnetic layers, projected on the other of the adjacent magnetic layers in the direction perpendicular to the surface of the recording medium, overlapping crystal grains of the other of the adjacent magnetic layers, said crystal grains of adjacent magnetic layers whose projections overlap crystal grains of the other of the adjacent magnetic layers having different crystal orientations than the overlapped crystal grains.

11. A magnetic recording system according to claim 10, wherein the average crystal orientation of the magnetic crystal grains constituting at least one of the magnetic layers in the direction perpendicular to the medium surface is different from the average crystal orientation of the magnetic crystal grains constituting the other magnetic layers in the direction perpendicular to the medium surface.

12. A magnetic recording system according to claim 10, wherein said magnetoresistive magnetic head includes two shield layers of a soft magnetic material spaced from each other by the distance of at most 0.35 μm and a magnetoresistive sensor formed between said two shield layers, and said magnetic recording medium is such that the product Br×t is between 10 G·μm and 100 G·μm inclusive, where t is the total thickness of the magnetic layers and Br is the residual magnetic flux density along the recording direction.

13. A magnetic recording system according to claim 10, wherein said magnetoresistive magnetic head includes a plurality of conductive magnetic layers undergoing a considerable resistance change with relative change of the respective magnetization directions thereof under the influence of an external magnetic field, and at least one conductive non-magnetic layer arranged between said conductive magnetic layers.

14. A magnetic recording system according to claim 10, wherein the crystal grains of the adjacent magnetic layers, whose projections in the direction perpendicular to the surface of the recording medium overlap crystal grains in the other of the adjacent magnetic layers, include Co-alloy crystal grains, Co-alloy crystal grains of one of the adjacent magnetic layers having a c-axis orientation of the hexagonal closed pack lattice thereof substantially parallel to the surface of the recording medium, and the Co-alloy crystal grains of the other of the adjacent magnetic layers, whose projections respectively overlap with Co-alloy crystal grains of said one of the adjacent magnetic layers which have the c-axis orientation substantially parallel to the recording medium surface, have a c-axis orientation of the hexagonal closed pack lattice thereof substantially orthogonal to the surface of the recording medium.

15. A magnetic recording system according to claim 14, wherein said magnetic layers include a first magnetic layer near to the substrate surface and a second magnetic layer formed on said first magnetic layer through an intermediate layer, projections of respective crystal grains of the first and second magnetic layers, projected in the direction perpendicular to the surface of the recording medium, overlapping crystal grains of the other of the first and second magnetic layers at overlapped positions, and wherein the ratio Nc/Na is at least 0.2, where Nc is the number of crystal grains of the second magnetic layer with the c-axis orientation thereof substantially orthogonal to the c-axis orientation of the crystal grains of the first magnetic layer whose projections overlap said crystal grains in the overlapped positions, and Na is the number of crystal grains of the second magnetic layer with the c-axis orientation thereof substantially parallel to the c-axis orientation of such crystal grains of the first magnetic layer whose projections overlap said crystal grains in the overlapped positions.

16. A magnetic recording system comprising:
- a magnetic recording medium having a plurality of magnetic layers and at least one intermediate layer arranged between adjacent ones of said magnetic layers;
- a drive section for driving said magnetic recording medium in the recording direction;
- a magnetic head having a write section and a read-back section;
- means for driving said magnetic head into motion relative to said magnetic recording medium; and
- read/write signal processing means for applying signals to said magnetic head and reproducing the output signal from said magnetic head;
- wherein the read-back section of said magnetic head includes a magnetoresistive magnetic head, and the direction of the magnetic easy axes of the magnetic layers of the magnetic recording medium is located within the film plane of the magnetic layers, the directions of the magnetic easy axes of the respective magnetic layers being not correlated with each other.

17. A magnetic recording system according to claim 16, wherein said magnetoresistive magnetic head includes two shield layers of a soft magnetic material spaced from each other by the distance of at most 0.35 µm and a magnetoresistive sensor formed between said two shield layers, and said magnetic recording medium is such that the product Br×t is between 10 G·µm and 100 G·µm inclusive, where t is the total thickness of the magnetic layers and Br is the residual magnetic flux density along the recording direction.

18. A magnetic recording system according to claim 16, wherein said magnetoresistive magnetic head includes a plurality of conductive magnetic layers undergoing a considerable resistance change with relative change of the respective magnetization directions thereof under the influence of an external magnetic field, and at least one conductive non-magnetic layer arranged between said conductive magnetic layers.

19. A magnetic recording system comprising:
a magnetic recording medium having a plurality of magnetic layers and at least one intermediate layer arranged between adjacent ones of said magnetic layers;
a drive section for driving said magnetic recording medium in the recording direction;
a magnetic head including a write section and a read-back section;
means for driving said magnetic head into motion relative to said magnetic recording medium; and
read/write signal processing means for applying signals to said magnetic head and reproducing the output signal from said magnetic head;
wherein the read-back section of said magnetic head includes a magnetoresistive magnetic head, and said intermediate layer of said magnetic recording medium is composed of two kinds of layers, and one of said two kinds of layers is made of Ta, Hf or the alloy of Ta or Hf including at least one element selected from Zr, Nb, Ti, V, Mo and W, and the other of said two kinds of layers is made of Cr or the alloy of Cr including at least one element selected from Zr, Nb, Ti, V, Mo and W.

20. A magnetic recording system according to claim 19, wherein said intermediate layer includes a Cr layer formed on selected one of a Ta layer and a Hf layer.

21. A magnetic recording system according to claim 20, wherein the sum of thicknesses of the Cr layer and selected one of the Ta layer and the Hf layer of said non-magnetic intermediate layer is 2 to 20 nm.

22. A magnetic recording system according to claim 19, wherein said magnetic layers are composed of a Co-based alloy.

23. A magnetic recording system according to claim 19, wherein said magnetoresistive magnetic head includes two shield layers of a soft magnetic material spaced from each other by the distance of at most 0.35 µm and a magnetoresistive sensor formed between said two shield layers, and said magnetic recording medium is such that the product Br×t is between 10 G·µm and 100 G·µm inclusive, where t is the total thickness of the magnetic layers and Br is the residual magnetic flux density along the recording direction.

24. A magnetic recording system according to claim 19, wherein said magnetoresistive magnetic head includes a plurality of conductive magnetic layers undergoing a considerable resistance change with relative change of the respective magnetization directions thereof under the influence of an external magnetic field, and at least one conductive non-magnetic layer arranged between said conductive magnetic layers.

25. A magnetic recording system according to claim 23, wherein said magnetoresistive magnetic head includes a plurality of conductive magnetic layers undergoing a considerable resistance change with relative change of the respective magnetization directions thereof under the influence of an external magnetic field, and at least one conductive non-magnetic layer arranged between said conductive magnetic layers.

* * * * *